(12) United States Patent
Büssert et al.

(10) Patent No.: US 7,911,333 B2
(45) Date of Patent: Mar. 22, 2011

(54) MOTION MONITORING

(75) Inventors: Jürgen Büssert, Igensdorf (DE);
Thomas Heimann, Erlangen (DE);
Jürgen Lange, Amberg (DE);
Rolf-Dieter Pavlik, Erlangen (DE);
Hagen Terpitz, Hemhofen/Zeckern (DE)

(73) Assignee: Siemens Aktiengesellschaft, Munich (DE)

( * ) Notice: Subject to any disclaimer, the term of this patent is extended or adjusted under 35 U.S.C. 154(b) by 318 days.

(21) Appl. No.: 12/086,441

(22) PCT Filed: Dec. 1, 2006

(86) PCT No.: PCT/EP2006/069190
§ 371 (c)(1),
(2), (4) Date: Jun. 12, 2008

(87) PCT Pub. No.: WO2007/068607
PCT Pub. Date: Jun. 21, 2007

(65) Prior Publication Data
US 2009/0072986 A1    Mar. 19, 2009

(30) Foreign Application Priority Data

Dec. 16, 2005  (DE) .......................... 10 2005 060 352
Sep. 29, 2006  (DE) .......................... 10 2006 046 286

(51) Int. Cl.
G08B 29/00    (2006.01)

(52) U.S. Cl. .......................... 340/507; 340/508; 340/679

(58) Field of Classification Search .................. 340/679, 340/680, 682, 686.1, 686.2, 686.3, 438, 439, 340/507, 508; 73/118.01; 700/9, 21; 101/107, 101/112; 324/503
See application file for complete search history.

(56) References Cited

U.S. PATENT DOCUMENTS

| | | | | |
|---|---|---|---|---|
| 5,469,032 A * | 11/1995 | Otake | ...................... | 318/400.21 |
| 6,567,709 B1 * | 5/2003 | Malm et al. | ..................... | 700/21 |
| 6,591,217 B1 | 7/2003 | Baur et al. | | |
| 6,892,129 B2 * | 5/2005 | Miyano | ........................ | 701/107 |
| 7,360,408 B2 * | 4/2008 | Dingler et al. | ............. | 73/118.01 |
| 7,671,601 B2 * | 3/2010 | Takayama | ..................... | 324/503 |
| 2008/0190166 A1 | 8/2008 | Hahn et al. | | |

FOREIGN PATENT DOCUMENTS

| | | |
|---|---|---|
| DE | 19937737 C2 | 3/2001 |
| DE | 100 37 737 A1 | 2/2002 |
| DE | 102 00 436 A1 | 7/2003 |
| DE | 103 42 390 A1 | 4/2004 |
| DE | 102004021635 A1 | 12/2005 |

(Continued)

OTHER PUBLICATIONS

Michael Volz, "Die PNO Stellt Ein Neues Profibus-Profil Fuer Sicherheitsgerichteteanwendungen Vor. PROFISafe für die Sicherheitstechnik", Messen Und Prufen, IVA International, Munchen, Germany, vol. 35, No. 5, May 1999, pp. 6-8, XP000896541.

*Primary Examiner* — Van T. Trieu

(57) ABSTRACT

There is described a method for motion monitoring of a machine, comprising a sensor, wherein a sensor signal is transmitted from the sensor to a controller and/or to a drive device, a failsafe controller or drive device being employed as controller or drive device. The controller or drive device comprises three independent monitoring devices in which the sensor signal is formed from a first and a second redundant actual position value.

12 Claims, 5 Drawing Sheets

FOREIGN PATENT DOCUMENTS

| | | |
|---|---|---|
| EP | 0 658 832 A2 | 6/1995 |
| EP | 0 742 499 A2 | 11/1996 |
| EP | 0 742 503 A2 | 11/1996 |
| EP | 0 742 505 A2 | 11/1996 |
| EP | 1 043 640 A2 | 10/2000 |
| EP | 1 402 987 A2 | 3/2004 |
| WO | WO 01/11375 A1 | 2/2001 |
| WO | WO 02/086633 A2 | 10/2002 |
| WO | WO 2005/109132 A1 | 11/2005 |

* cited by examiner

MOTION MONITORING

CROSS REFERENCE TO RELATED APPLICATIONS

This application is the US National Stage of International Application No. PCT/EP2006/069190, filed Dec. 1, 2006 and claims the benefit thereof. The International Application claims the benefits of German application No. 10 2005 060 352.1 DE filed Dec. 16, 2005, and of German application No. 10 2006 046 286.6 DE filed Sep. 29, 2006, all of the applications are incorporated by reference herein in their entirety.

FIELD OF INVENTION

The present invention relates to a method and a corresponding apparatus for motion monitoring. Methods and apparatuses for motion monitoring are known per se. Such motion monitoring is usually performed by means of a sensor device constituting a sensor system.

BACKGROUND OF INVENTION

Sensor devices are particularly important in the technical field of drive and control system safety for e.g. machine tools or production machinery, etc. In a machine, a motor is used e.g. to change the position and speed or angular velocity of a tool. In order to detect such a position or speed, e.g. magnetic or optical sensor systems are disposed directly on the motor. For example, optical sensor systems comprise a light emitting diode which transmits light to two phototransistors via a slotted glass disk which rotates with the motor. The signals of the phototransistors are the output signals of the sensor system and are in particular sinusoidal and cosinusoidal. These signals must be evaluated such that at least one actual position value for the tool is produced. In addition, the rpm or speed of the tool must be determinable from the position and the sampling time. The setpoint position value is predefined by the geometry of the workpiece to be machined. The position controller uses the actual position value to adjust the setpoint position value.

To generate the actual position value, the sine and cosine curves are interpolated by means of electronics provided for that purpose. An analog-digital converter converts the analog signals into digital signals, and the zero crossing count of the sine or cosine curves is determined in order to ascertain which sine or cosine curve in the order thereof is currently being output by the sensor system. For fine determination of the angle, the sine is divided by the cosine and from this value the arc tangent is ascertained. If the slotted glass disk has e.g. 2048 slots, 2048 sine or cosine curves are obtained per motor revolution. The arc tangent can once again be resolved into e.g. 2048 individual steps, thereby producing approximately four million possible items of information for each revolution of the motor.

In order to reduce any possible susceptibility to malfunction of the electronics, two-channel evaluation is provided whereby the signals are processed by the sensor independently of one another in two similar channels. The actual position value determined by one channel is compared with the actual position value determined in the other channel. If the actual position values coincide within defined tolerances, the actual position value of one of the two channels is used as the output signal. If the actual position values of the two channels do not coincide, a fault indication is produced. As the position control loop cannot operate reliably in such a case, the machine as a whole is stopped.

EP 1 402 987 A2 discloses a method for monitoring an energy source, e.g. a laser, guided by means of a robot as an example of a handling device, wherein the speed of the energy source is measured and evaluated as an exception situation if the measured speed falls below a predefined threshold value. In such a situation the energy source is switched off with the intention of thereby avoiding risks to people and environment. EP 0 742 499 A2 describes an approach for reliable processing of safety-oriented process signals wherein reliable two- or multi-channel monitoring and signal processing of safety-oriented process signals is made possible by integration of monitoring devices and safety circuits that are conventionally installed externally into already existing components of a machine controller.

DE 103 42 390 A1 describes an approach for reliable processing of a position measurement value, wherein the position measurement value of a measurement station is supplied to a first receiver unit of a first receiver assembly on the one hand and to a second receiver unit of a second receiver assembly on the other, and wherein each receiver assembly has two receiver units, of which one receives position measurement values from one measurement station and the other receives position measurement values from another measurement station. To that extent said approach therefore relates only to the input-side processing of position measurement values.

SUMMARY OF INVENTION

An object of the invention is to specify simple and safe motion monitoring in the form of a relevant apparatus and a corresponding method.

To achieve this object, a method having the features recited in an independent claim is proposed. The above-mentioned object is also achieved using an apparatus for motion monitoring having means for carrying out the above-mentioned method. In particular there is provided for this purpose an apparatus with a motor, a single sensor for the or a motor, a drive device for the or a motor, a failsafe controller assigned to the drive device, and wherein a sensor signal which can be generated by the sensor can be processed at least by the failsafe controller which for this purpose has a redundantly configured monitoring device, a first or second shutdown path being activatable by said redundantly configured monitoring device.

The dependent claims are directed to preferred embodiments of the present invention.

Back-references used in the dependent claims relate to further refinements of the subject matter of the main claim by virtue of the features of the particular dependent claim; they are not to be understood as a waiver of the right to independent, objective protection for the combination of features of the dependent claims to which they refer. In addition, having regard to an interpretation of the claims in the case of a more detailed concretization of a feature in a subordinate claim, it is to be assumed that such a restriction does not exist in the respective preceding claims.

A possible field of application of the invention is a press controller, a press being one example of a production machine. Reliable motion monitoring using in particular only one sensor is used, for example, to protect the machine operator from hazardous motions, particularly in the event of manual interventions where monitoring for safely reduced speed, direction of rotation, and/or safe operating stop can be important. Also of importance is safe shutdown in the drive (safe stop) in the case of electric axles or even for electric or hydraulic drives.

To ensure reliable detection of an actual rpm, the sensors have hitherto been configured redundantly, resulting in high costs, an increased space requirement and wiring complexity. For reliable evaluation, safe evaluation monitoring of the rpm using a monitoring/evaluation unit is necessary. Units of this kind have hitherto been external devices. The disadvantage of this is that additional programming using an additional programming tool is necessary.

According to the invention, the monitoring/evaluation is advantageously incorporated in an automation device already being used for some other purpose. Said automation device is used, for example, for closed-loop control of a drive or even for open-loop control of a process.

Compared to a failsafe control device which is provided for open-loop and/or closed-loop control tasks and can be used as a monitoring device, systems with redundant control devices have the disadvantage of requiring duplicated programming and synchronization of the control devices.

According to one embodiment of the invention, the motion monitoring is performed in a drive unit which also acts as a monitoring device.

The monitoring device is e.g. a failsafe programmable logic controller (F-PLC). Moreover, an F-PLC of this kind can also be embodied to carry out further open-loop control, closed-loop control and monitoring functions. The F-PLC is often already present in a machine. The F-PLC can additionally be used for safe motion monitoring. Safe shutdown in the drive takes place e.g. via safe I/O triggering.

One or more of the following functions are also advantageously implemented
   safe detection of the actual rpm
   transmission of the redundant actual values to the F-PLC via a protected telegram (safe actual value is generated and stored for other tasks in the drive unit)
   fast fault reaction
   additional rpm monitoring also in the integrated controller of the drive unit (reacts earlier than the F-PLC in the case of error-free hardware/software; fast shutdown via the drive telegram.

The particular advantages of the invention and/or embodiments thereof are as follows:
   "integrated solution": no additional controller or external monitoring unit
   uniform programming of safe logic and motion monitoring
   synchronization of safe logic and motion monitoring
   only one (sin/cos) sensor
   secondary "fast shutdown"

A system for safe motion monitoring can be embodied as follows:
   System for safe rpm monitoring (in particular for production machines or press controllers) of a variable speed drive, comprising:
      a) Motor rpm monitoring by means of a failsafe PLC
      b) Safe detection of the actual rpm using a single sensor
      c) Failsafe transmission of the actual rpm via a field bus
      d) Safe motor shutdown via failsafe input/output terminals of the PLC (in particular F-PLC)

Advantageously, simultaneous monitoring of the motor rpm additionally takes place in the drive unit to implement fast shutdown.

The F-PLC is advantageously integrated in the drive unit.

At least one failsafe input/output is advantageously integrated in the drive unit.

Shutdown advantageously takes place not via failsafe terminals but via a failsafe drive telegram.

Fast shutdown advantageously takes place via the axle telegram. Technical requirements for a failsafe system are set out e.g. in the following standards:
   Draft IEC 61800-5-2
   IEC/EN 61508

Failsafe controllers of the type known e.g. from EP 1 043 640 A2 are able to evaluate safety-relevant field signals and immediately switch to or stay in a safe condition in the event of faults. This ability is based for example on the principle of time-diversity redundancy (coded processing). Here, safety-oriented operations are processed on two different paths, i.e. with (logically and chronologically) different (diversity) algorithms and the results compared at the end of the CPU cycle. Deviations mean that a fault has occurred on one of the two paths and the CPU switches automatically to a safe condition. In addition, a controller can have extensive self-diagnostic facilities. Siemens AG's Simatic Safety Integrated, for example, provides failsafe systems tailored to many different requirements of the process industry and the manufacturing industry. Thus, for instance, failsafe controllers in different performance ranges are available for production technology.

Protecting e.g. people, production equipment and the environment is a basic requirement of the process industry. The controller provided by the applicant under the designation Simatic S7-400FH can be typically used as a failsafe controller for this purpose. A controller of this kind is based on the CPUs of a high-availability controller, e.g. a controller as provided by the applicant under the designation Simatic S7-400H. The system is made failsafe by the so-called F-program (F for failsafe) running in the CPU and incorporating safety functions, and by failsafe signal modules. For the safety functions, functional blocks can be called from an F-library and interconnected with the aid of the engineering tool. The F-library contains preassembled basic functional blocks approved by a certification or testing agency (e.g. TÜV or trade association) as well as a parameterization tool for the failsafe peripherals. Failsafe peripheral modules e.g. peripheral modules of the type provided by the applicant under the designation Simatic ET 200M or Simatic ET 200S system are available. These failsafe peripheral modules are parameterized with the parameterization tool contained in the F-library. Communication between the components incorporated in the overall system takes place e.g. via a field bus, e.g. the so-called Profibus, more particularly Profibus DP, the failsafe modules being controlled by the Profibus profile "ProfiSafe" for safety-relevant applications. The Profibus profile ProfiSafe is an example of a safety field bus.

Examples of preferred embodiments of the invention are illustrated in the accompanying drawings and described below.

The method according to the invention is preferably implemented in software, with the result that the invention relates both to the method and to a computer program containing computer-executable program code instructions for implementing the method described above or below. Similarly, the invention also relates to a computer program product, in particular a storage medium, e.g. a data carrier such as a diskette or the like, containing such a computer-executable computer program.

The claims filed with the application are formulation proposals without prejudice to the attainment of broader patent protection. The applicant reserves the right to claim additional combinations of features only disclosed so far in the description and/or drawings.

The or each exemplary embodiment is not to be understood as a limitation of the invention. Rather, numerous variations and modifications are possible within the scope of the present disclosure, in particular such variants, elements, and combinations as are obvious to those skilled in the art in respect of achieving the object, e.g. by combining or modifying individual features or elements or steps described in the general or specific description and also contained in the claims and/or the drawings, and resulting in a new subject matter or new steps or step sequences through combinable features.

BRIEF DESCRIPTION OF THE DRAWINGS

An exemplary embodiment of the invention will now be described in greater detail with reference to the drawing. Mutually corresponding items or elements are provided with the same reference characters in all the figures.

DETAILED DESCRIPTION OF INVENTION

Figure 1:
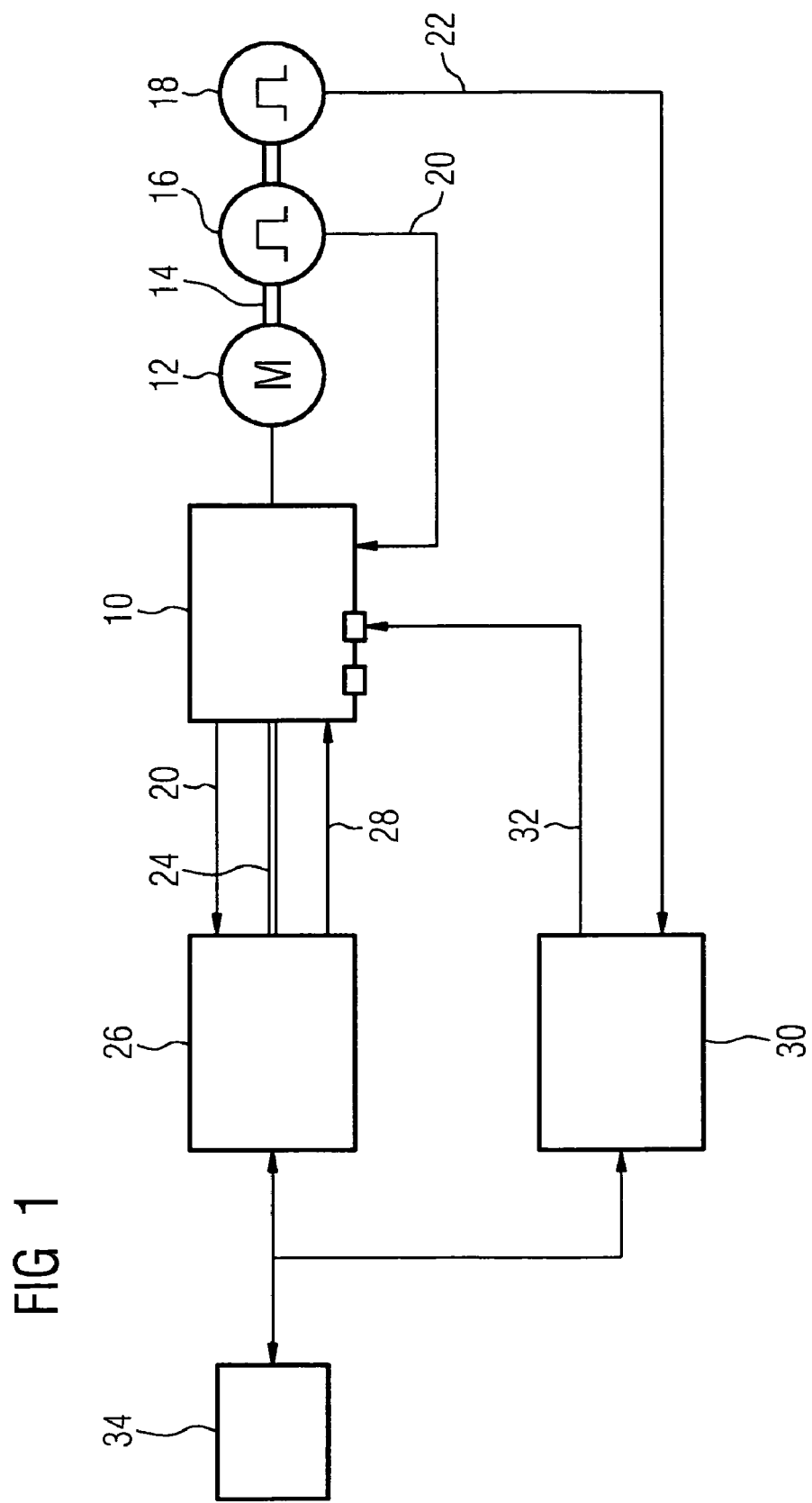
FIG. 1 shows a first embodiment of a known motion monitoring arrangement.

For an explanation of motion monitoring known from the prior art, FIG. 1 shows a drive device 10 (only schematically illustrated) which drives e.g. a motor 12 as power unit, the motor 12 with possibly other power units being part of a technical process (not shown), e.g. a press controller.

The motor 12 drives a shaft 14, thereby influencing a tool (not shown). To detect motion information in respect of the motor 12, a first and a second sensor 16, 18 are provided. The two sensors 16, 18 are assigned to the shaft 14 and detect e.g. a position or a speed of the shaft 14 as motion information. Each sensor 16, 18 delivers its own output signal, i.e. a first sensor signal 20 and a second sensor signal 22. The first sensor signal 20 is fed to the drive device 10 which is communicatively connected to a first controller 26 via a field bus 24, e.g. the so-called Profibus. The first controller 26 is responsible for the actual evaluation of the first sensor signal 20 which is transmitted from the drive device 10 via the field bus 24 to the first controller 26 for this purpose. If inspection of the first sensor signal 20 by the first controller 26 indicates an exception situation, the first controller 26 produces a relevant first control signal 28 which is fed to the drive device 10 via the field bus 24. With the first control signal 28, fast shutdown of the motor 12 can take place e.g. under the control of the drive device 10. The second sensor signal 22 is evaluated by a second controller 30 provided redundantly with respect to the first controller 26. If the second controller 30 detects an exception situation with regard to the second sensor signal 22, it transmits to the drive device 10 a relevant second control signal 32 with which likewise e.g. the above-mentioned fast shutdown of the motor 12 can be initiated. Both the first and the second control signal 28, 32 can assume different values or a plurality of first and second control signals 28, 32 can be provided so that different reactions to an exception situation identified by one of the controllers 26, 30 are possible. It can be optionally provided that one or both of the controllers 26, 30 is assigned an input/output device 34 by means of which any exception situations can be displayed e.g. to operating personnel. For this purpose the input/output device 34 is communicatively connected in a suitable manner to the or each controller 26, 30.

Figure 2:
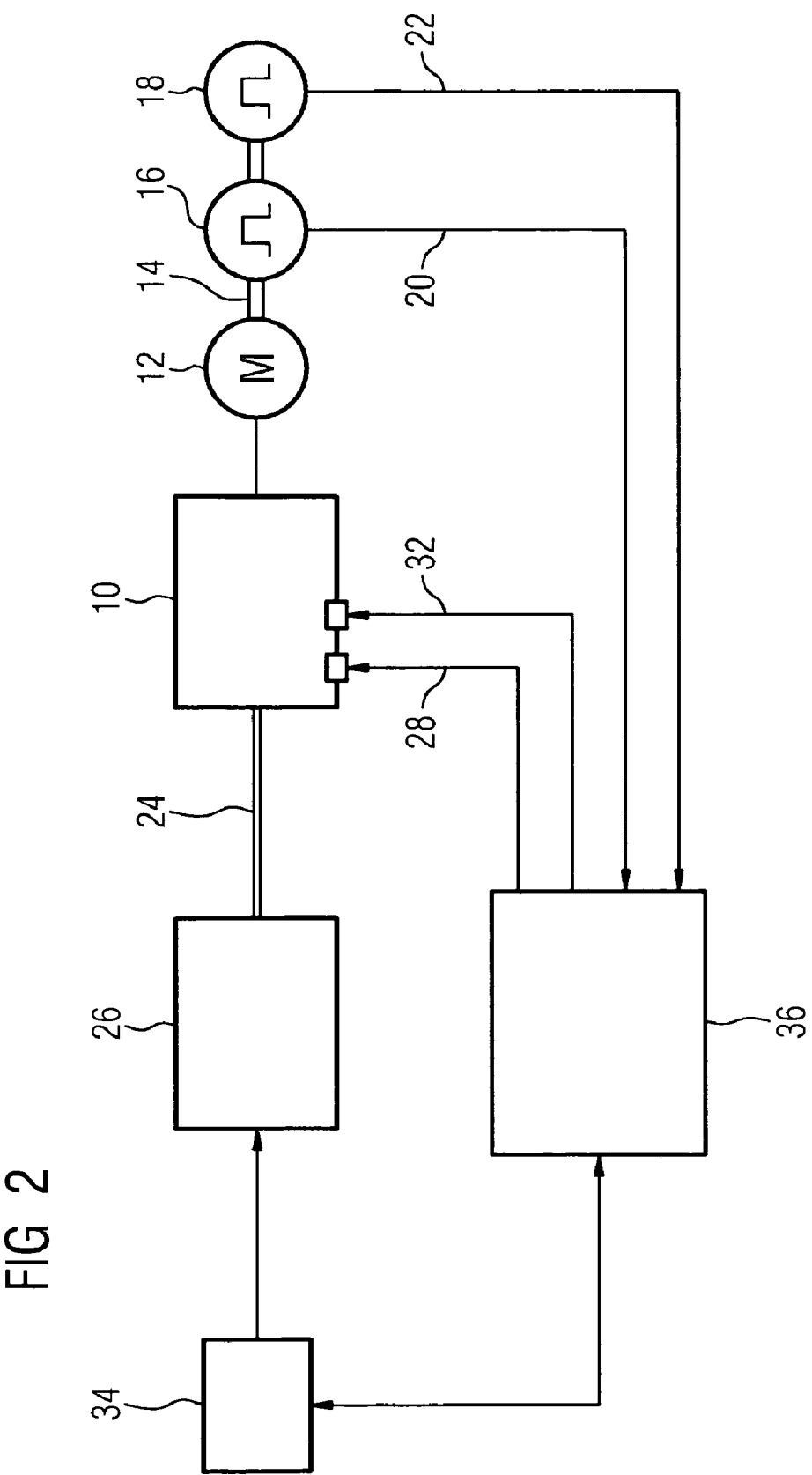
FIG. 2 shows a second embodiment of a known motion monitoring arrangement.

FIG. 2 shows an alternative and likewise known variant of the configuration in FIG. 1. In the example shown in FIG. 2, motion monitoring is again performed via two sensors 16, 18 whose sensor signals (first sensor signal 20 and second sensor signal 22) are fed out via a monitoring unit 36 provided in addition to the first controller 26. The monitoring unit 36 evaluates the two sensor signals 20, 22 and, depending on whether an exception situation is present in respect of one of the sensor signals 20, 22, issues a relevant first or second control signal 28, 32 which is evaluated by the drive device 10 and brings about e.g. fast shutdown of the motor 12 under the control of the drive device 10.

Figure 3:
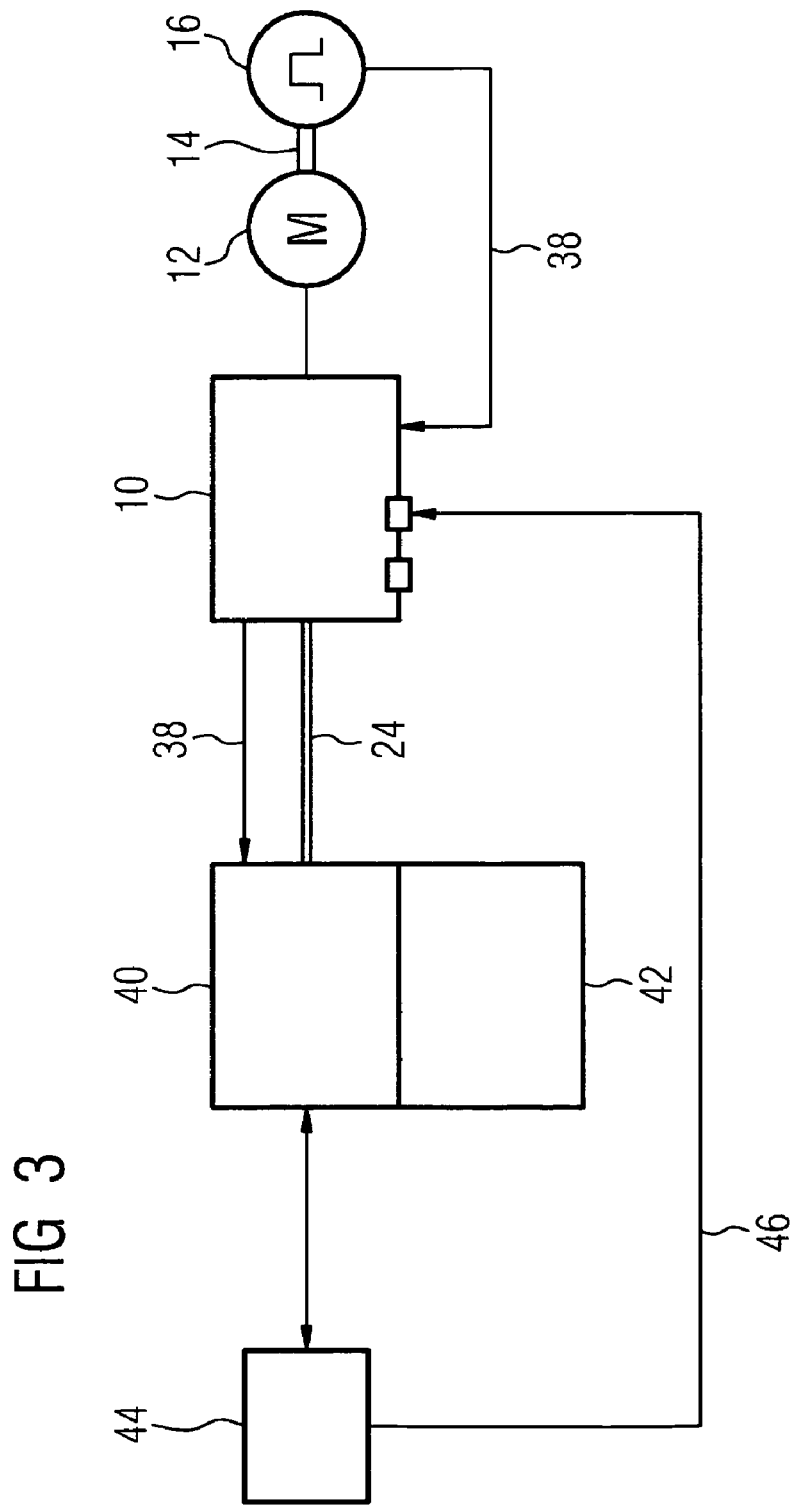
FIG. 3 shows a simplified schematic diagram of motion monitoring according to the invention.

FIG. 3 shows an embodiment of the inventive solution. In respect of the diagram in FIG. 3, only the differences compared to the embodiments according to FIG. 1 and FIG. 2 will now be described. Unlike the embodiments shown in FIG. 1 and FIG. 2, in the embodiment shown in FIG. 3 a single sensor is provided, namely only the first sensor 16. As said first sensor 16 is the only sensor in the overall arrangement, the first sensor 16 will hereinafter be referred to simply as sensor 16.

The sensor 16 produces a safe actual sensor value 38 as its output signal. The output signal of the sensor 16 is produced as a safe actual sensor value 38 as a result of performing sensor evaluation on a redundant basis. This can include e.g. forming, as position information, two actual position values, e.g. a first actual value with full accuracy (standard total sensor value with or without fine resolution) and a second, coarser actual value (redundant coarse position value) from the sine and cosine signals of the sensor 1, the first and second actual position value, i.e. in particular standard total sensor value and redundant coarse position value, being determined via diversity hardware. The safe actual sensor value 38 is first routed to the drive device 10 from which it is fed to a control unit, e.g. a failsafe programmable logic controller, implemented as a failsafe controller 40. The failsafe controller 40 is communicatively connected to the drive via a field bus 24. The field bus 24 is also used to transmit the safe actual sensor value 38 from the drive to the failsafe controller 40.

The failsafe controller 40 comprises a monitoring device 42. The safe actual sensor value 38, i.e. in particular the sensor information with standard total sensor value and redundant coarse position value, is checked for plausibility by the monitoring device 42 in the area of the failsafe controller 40 and, in the event of a fault, a corresponding shutdown reaction is triggered. For this purpose there is provided a failsafe input/output 44 which, when appropriately activated, produces a control signal 46 which is fed to the drive device 10 where it initiates the relevant shutdown reaction.

While in order to detect any errors in the transmission of the safe actual sensor value 38 from the sensor 16 to the drive device 10 or from the drive 10 to the failsafe controller 40 a redundant actual sensor value of the type described above is produced from the sine and cosine signals of the sensor 16, the transmission of which up to the drive device 10 being e.g. via a so-called DRIVE-CliQ connection, so-called "heartbeat" monitoring and a CRC check are performed in order to ensure data transfer and check the operation of the two controllers. The monitoring device 42 compares the standard total position with the redundant coarse position and carries out a plausibility check in this respect. In the event of a fault, a so-called pulse inhibitor is triggered and a relevant control signal 46 is generated via the path 44. An actual sensor value 38 identified as valid (uncorrupted) can be further processed and/or monitored.

Figure 4:
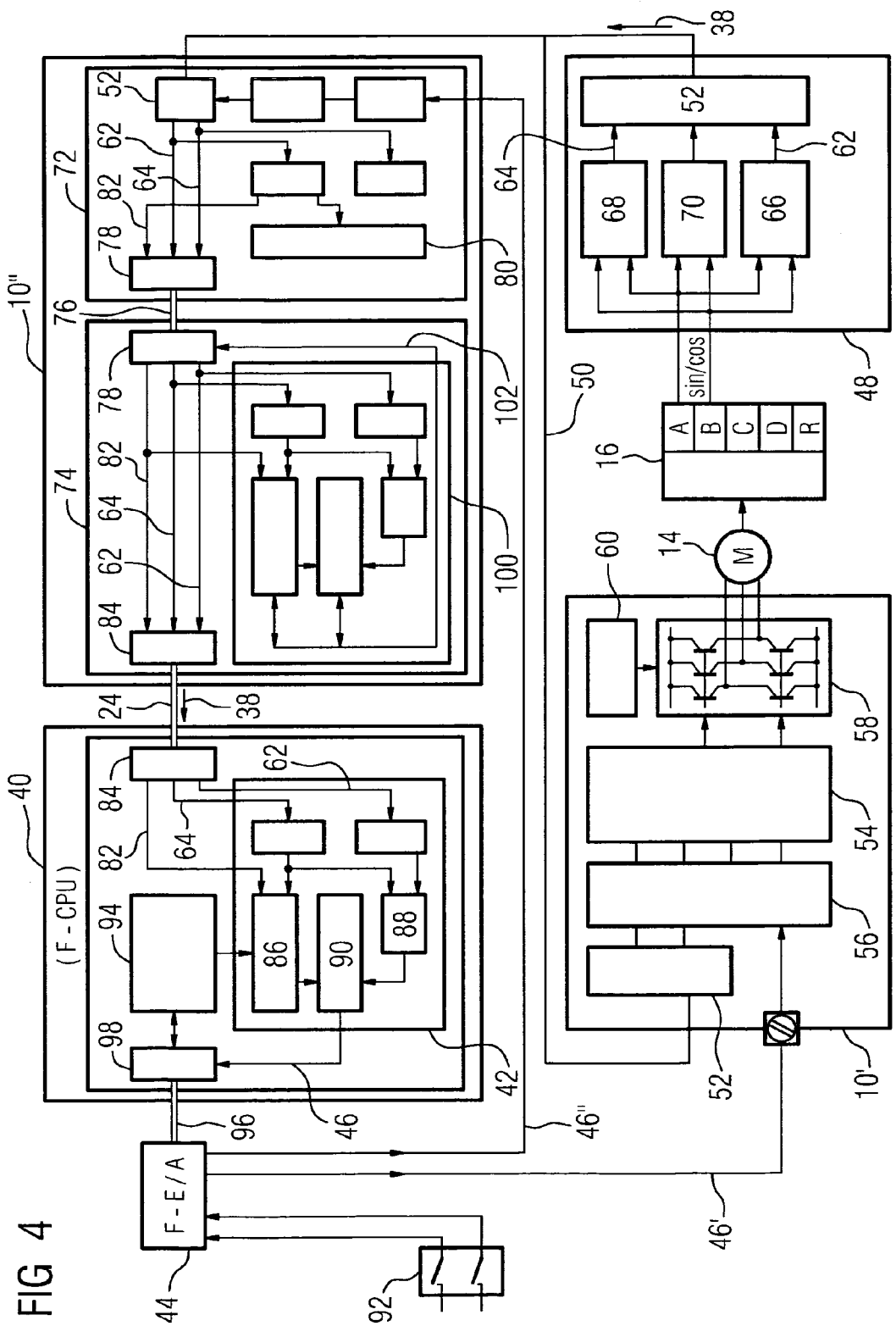
FIG. 4 shows a more detailed diagram of motion monitoring according to the invention.

FIG. 4 shows the embodiment according to FIG. 3 in greater detail. The drive device 10 (FIG. 3) is now shown in the form of a motor module 10' and a motor controller 10" communicatively connected thereto. A sensor evaluator 48 (not previously illustrated) is shown connected downstream of the sensor 16. Inside the drive device 10 there exists a communicative link between its components, namely the motor module 10' and the motor controller 10", via a so-called DRIVE-CliQ connection 50. For this purpose both the motor module 10' and the motor controller 10" have a corresponding bus interface 52. A DRIVE-CliQ connection also exists to and from the sensor evaluator 48 which likewise has a bus interface 52 for this purpose. The motor module 10' incorporates diagnostic functionality 54 and monitoring functionality 56, power electronics 58 fed by a DC power supply 60 being provided for driving the motor 12.

The sensor 16 delivers as an output signal a sine and cosine signal from which two actual position values 62, 64 are formed in the sensor evaluator 48 as position information. For this purpose there is formed in a first functional block 66, as the first actual position value 62, an actual value with full accuracy, in particular a standard total sensor value, which maps a coarse and a fine position of the motor 12. In a second functional block 68, a redundant coarse position is formed by a redundant coarse position counter as the second actual position value 64. By combining the two actual position values 62, 64 there is formed from the output signal of the sensor 16 the safe actual sensor value 38 (FIG. 3) which is transmitted by means of the bus interface 52 and the DRIVE-CliQ connection 50 to the motor module 10' e.g. for speed or position control and to the motor controller 10" for motion monitoring. In addition to the first and second functional block 66, 68, there is provided in the area of the sensor evaluator 48 a third functional block 70 which performs a plausibility check in respect of the output signals received from the sensor 16 which essentially includes a comparison of the standard total sensor value and/or fine resolution with the redundant coarse position value, an exception situation being present in the event of a deviation by more than a predefined or predefinable tolerance and entailing the initiation of suitable action, e.g. immediate stop or pulse deletion.

In the area of the motor controller 10', the safe actual sensor value 38 in its form as a first and second actual position value 62, 64, i.e. in particular standard total sensor value or redundant coarse position value, is processed by a first and second functional unit 72, 74, the first functional unit 72 also being termed "drive control" and the second functional unit 74 being termed "MC controller" in the applicant's internal parlance. Between the two functional units 72, 74 there exists a bus connection, particularly in the form of a field bus, e.g. a so-called Profibus connection 76. The two functional units 72, 74 each have a bus interface 78 for this purpose. The two actual position values 62, 64 are tapped off inside the first functional unit 72 and can be fed to a drive control module 80 which is of no further relevance in the context of the invention. An rpm 82 or a measure for an rpm of the motor 12 can also be determined from the tap of the two actual position values 62, 64. The safe actual sensor value 38 in its form as a combination of the first and second actual position value 62, 64 is transmitted together with the rpm 82 from the first functional unit 72 to the second functional unit 74 via the bus connection 76. For connecting the field bus 24 (cf. FIG. 3), the second functional unit 74 also has a bus interface 84 via which the safe actual position value 38 and the rpm 82 can be transmitted to the failsafe controller 40 (cf. FIG. 3).

The failsafe controller 40 incorporates the monitoring device 42 (cf. FIG. 3) which in turn incorporates a first monitoring functional block 86 for motion monitoring, a second monitoring functional block 88 for comparing the two actual position values 62, 64 and a third monitoring functional block 90 for requesting a safe state. The second monitoring functional block 88 essentially performs a plausibility check in respect of the first and second actual position value 62, 64, in particular by comparing the standard total sensor value and redundant coarse position value. The first monitoring functional block 86 is additionally responsible for motion monitoring so that safety functions such as monitoring of emergency stop buttons, protective doors and the like are possible. Particularly to be mentioned as motion monitoring safety functions are: safely reduced speed, safe operating stop, zero speed with zero-speed control. The input signals required for this purpose, i.e. e.g. status information of an emergency stop button 92, are fed to the second monitoring functional block 68 via a failsafe input/output 44 (cf. FIG. 3) and a logic circuit 94 provided for its evaluation, e.g. in the form of a failsafe control program. In the event of an exception situation detected by the monitoring unit 42, a relevant control signal 46 is produced which is fed via a failsafe bus connection 96 and a bus interface 98 provided for the connection thereof, particularly in accordance with the conventions for "ProfiSafe", to the failsafe input/output 44 where it activates a first and second shutdown path 46', 46", the first and second shutdown path 46', 46" arising due to the fact that the failsafe controller 40, because of its failsafeness, implements each function in redundant form so that also the monitoring device 42 is redundantly configured e.g. using diversity hardware or diversity software or a mix of diversity hardware and/or software. Accordingly a control signal 46 can be produced for the monitoring device 42 shown or the redundant monitoring device (not shown). With two control signals 46 it is also possible for two shutdown paths 46', 46" to be activated. If the two monitoring devices 42, i.e. the monitoring device 42 shown and the redundant monitoring device (not shown) produce the same results, both monitoring devices 42 recognize an identical situation and would also transmit in each case a relevant control signal in the event of an exception situation being detected. The two shutdown paths 46', 46" are then activated.

Activation of the two shutdown paths 46', 46" need not necessarily take place simultaneously, because different dynamics may result due to the diversity implementation of the two monitoring devices 42. However, it is important in the present context that two shutdown paths 46', 46" are available, the first shutdown path 46' being routed via the motor module 10' as a component of the drive device 10 (FIG. 3) and the second shutdown path 46" via the motor controller 10", in particular its first functional unit 72, because of the non-redundant implementation of the functional units "upstream" of the failsafe controller 40. Therefore, in terms of the evaluation of the control signal 46, the diversity requirement is also met by non-redundant components because the first shutdown path 46' acts directly on the motor module 10' where, by means of suitable processing, the corresponding measures for controlling the motor 12 can be initiated, while the second shutdown path 46" acts on the motor controller 10" which is independent of the motor module 10' and from where independent, appropriate control of the motor 12 via the DRIVE-CliQ connection 50 is possible.

According to a preferred embodiment as shown in FIG. 4, it is provided that another monitoring device 100 is also provided for the motor controller 10". The additional monitoring device 100 has identical or at least essentially identical functionality to that of the monitoring device 42 provided in the area of the failsafe controller 40. The individual components of the additional monitoring device 100 will not therefore be explained again in the following. The essential fact in respect of the further monitoring device 100 is that it provides a third shutdown path 102, a relevant control signal being initially fed via the bus connection 76 to the first functional unit 72 of the motor controller 10'' and finally via the DRIVE-CliQ connection 50 to the motor module 10' where it effects appropriate control of the motor 14, such as bringing it to a standstill.

The additional monitoring device 100 is therefore provided in a non-redundant area of the overall configuration shown in FIG. 4, which means that it constitutes an additional though not failsafe monitoring facility. The additional monitoring device 100 is advantageous, however, because due to different dynamic relationships the third shutdown path 102 can in some cases bring about faster shutdown compared to monitoring in the area of the failsafe controller 40. Should the additional monitoring device 100 not detect an exception situation, failsafe handling of such an exception situation is still ensured by the failsafe controller 40 and the associated monitoring device 42. If the additional monitoring device 100 does detect the exception situation, a faster reaction thereto is possible in some cases.

Data transmission within the motor controller 10'' and from the motor controller 10'' to the failsafe controller 40, where neither the motor controller 10'' nor the internal communication links and those to the failsafe controller 40 are implemented in a failsafe manner, is protected by suitable measures such as heartbeat monitoring or a checksum method or the like, particularly in the form of what is termed a cyclic redundancy check (CRC), thereby enabling data transfer to be adequately safeguarded. Any data transmission errors can be detected immediately and handled as an exception situation.

With regard to the sensor 16 it should be noted that it supplies, as an output signal, in particular a sine and a cosine signal, i.e. two ninety degree phase shifted signals. Sensors which produce two signals in a fixed relationship to one another may be regarded as two sensors in respect of their failsafeness. A further requirement in this context is that the signals are evaluated separately, which is the case according to the approach in respect of the connection, as explained in particular above in conjunction with FIG. 4.

The standard coarse position is obtained by counting zero crossings of the output signals supplied by the sensor 16 or signals derived therefrom. The redundant coarse position results from redundant counting of corresponding zero crossings in a complementary signal. Here it can be contrived that a reverse counting direction is provided for the redundant coarse position so as to provide still greater diversity. The two actual position values 62, 64 obtained in this way can be provided with a checksum, e.g. a CRC signature, as a safeguard against corruption. When the two actual position values 62, 64 are compared in the monitoring device 42 and the thereto redundant monitoring device in the area of the failsafe controller 40 or by the additional monitoring device 100 in the motor controller 10'', the transmitted standard coarse position must not deviate by more than a predefined or predefinable threshold value, e.g. ±1, from the redundant coarse position. Prior to said comparison, the reverse counting direction in respect of the redundant coarse position must also be converted if necessary. Safeguarding by means of a checksum, e.g. CRC, can relate to one of the two actual position values 62, 64, in particular to the redundant coarse position, or to both actual position values 62, 64.

Figure 5:
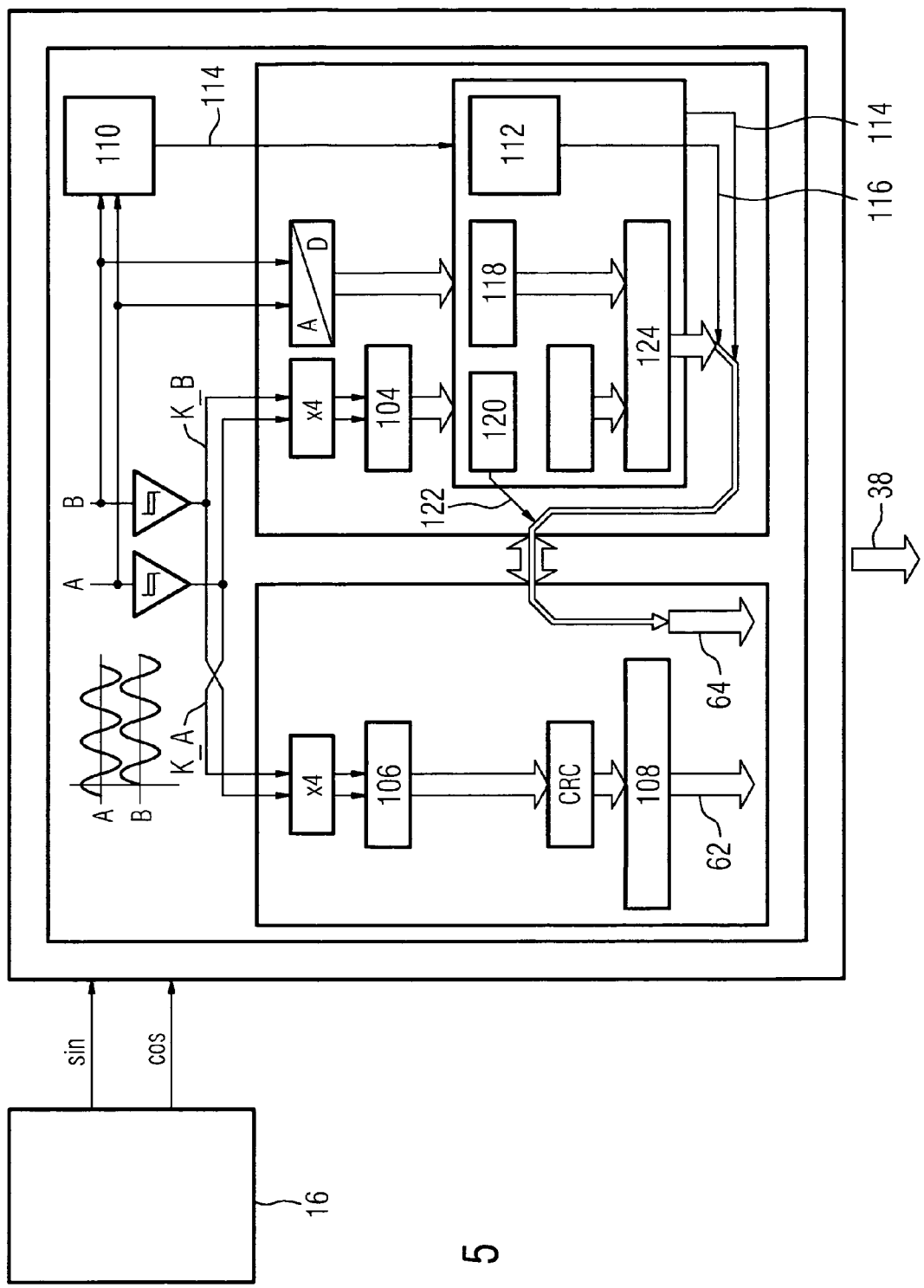
FIG. 5 shows details for the processing of a value processed during motion monitoring.

Finally the formation of the safe sensor value 38 in the area of the sensor evaluator 48 (cf. FIG. 3 and FIG. 4) will now be explained in greater detail with reference to the diagram in FIG. 5. The sine signal and the cosine signal of the sensor 16 are identified by the letters A and B in FIG. 5. For determining both the standard coarse position and the redundant coarse position, square wave signals K_A, K_B derived from the sine wave signals A, B are quadrupled by so-called four-edge evaluation, the standard coarse position being determined by a first counter 104 and the redundant coarse position by a second counter 106. The redundant coarse position is additionally protected using a checksum, in particular a CRC signature. This results in a redundant coarse position with CRC which is shown as a first data item 108 in the form of a block and flows into the safe actual sensor value 38 as a first actual position value 62.

In the area of or in connection with determining the standard total position there follow additional checks of the signals A, B, e.g. hardware amplitude monitoring by means of a first amplitude monitoring functional block 110 by which the signals A, B are monitored in respect of the conditions $|A|+|B|>1.41$ and $|A|+|B|<1$. Further monitoring takes place in the form of software amplitude monitoring by a second amplitude monitoring functional block 112 which monitors whether the signals A, B fulfill the condition $A^2+B^2=1$. If one of these checks produces a violation of the underlying conditions, a relevant first or second error signal 114, 116 is generated which flows into the safe actual sensor value 38 together with the second actual position value 64.

At high rpm (high sensor frequency), not all the transient amplitude errors such as peaks or dips are detected by sampling of the signals A, B (undersampling), possibly resulting in states in which, in the case of an overlap test as described below, although the two overlapping bit values only differ by a predefined threshold value, the coarse position is erroneous nonetheless (counted too high or too low). For this purpose external hardware amplitude monitoring 110 in respect of the sum of the absolute values of the signals A and B is provided. When said amplitude monitoring responds, the first error signal 114 is generated.

By means of the software amplitude monitoring 112 in respect of fulfillment of the condition $A^2+B^2=1$, faults such as line break, "Stuck-at-High" and "Stuck-at-Low" and naturally also direct sensor faults are detected. On leaving a particular tolerance range, i.e. identical fulfillment of the condition $A^2+B^2=1$ is not necessarily required, the second fault signal 116 is generated.

The standard total position is finally produced by combining the coarse and fine position, the coarse position resulting from the value of the first counter 104. The fine position is produced after analog/digital conversion of the signals A, B, by applying a mathematical operation to these two signals, e.g. an operation of the type "arc tangent (A/B)". For this or a comparable operation a fourth functional block 118 is provided.

When the coarse and fine positions are combined, the two most significant bits of the fine position overlap with the two least significant bits of the coarse position, thereby producing for these two bit positions in the standard total position two values which must be corrected to one value. Due to delays and sampling, these two values may differ by a predefined or predefinable threshold value, e.g. ±1. Priority is given to the fine information value. The coarse position, i.e. the value of the first counter 104, is appropriately corrected prior to combining the coarse and fine position to produce the total position. For this or a comparable operation a fifth functional block 120 is provided.

In the event of deviations greater than the predefined or predefinable threshold value, a third fault signal 122 is generated which flows into the second actual position value 64 and therefore into the safe actual sensor value 38. The resulting total position, i.e. the standard total position, is shown as the second data item 124 and forms the basis for the second actual position value 64.

The invention claimed is:

1. A method for motion monitoring of a machine having a sensor assigned to a power unit, comprising:
    transmitting a sensor signal from the sensor to a failsafe controller, wherein the failsafe controller incorporates redundantly configured monitoring devices for evaluating the sensor signal, wherein each monitoring device monitors the sensor signal independently of the respective other monitoring device and is capable to generate a control signal for activating a first or second shutdown path, wherein
        the first shutdown path leads via a motor module and the second shutdown path leads via a motor controller as different components of the drive device and
        the power unit is influenced by the motor module and/or the motor controller in accordance with the control signal received via the first or second shutdown path, and
    transmitting the sensor signal to a drive device which is implemented at least partially in a failsafe manner.

2. The method as claimed in claim 1, wherein a failsafe field bus is used for transmitting the sensor signal.

3. The method as claimed in claim 1, wherein the drive device is assigned a further monitoring device which checks the sensor signal independently of the monitoring device of the failsafe controller and if necessary generates a control signal for activating a third shutdown path.

4. The method as claimed in claim 1, wherein the sensor signal is formed by a first and a second actual position value, the second actual position value acting as a redundant actual position value to the first actual position value.

5. The method as claimed in claim 4, wherein the two actual position values are formed from signals supplied by the sensor at least on the basis of an output signal of a respective counter.

6. The method as claimed in claim 4, wherein one of the actual position values undergoes hardware amplitude monitoring by a first amplitude monitoring functional block and/or software amplitude monitoring by a second amplitude monitoring functional block.

7. The method as claimed in claim 6, wherein either the hardware amplitude monitoring or the software amplitude monitoring if necessary generate a fault signal which flows into the sensor signal.

8. The method as claimed in claim 6, wherein one of the actual position values maps a coarse and a fine position of a motor controlled by the drive device, the coarse and fine position overlapping at least in part and an overlapping region being checked for a deviation by no more than a predefined or predefinable threshold value.

9. The method as claimed in claim 8, wherein a third fault signal is generated.

10. An apparatus for motion monitoring, comprising:
    a motor;
    a single sensor for the motor;
    a power unit, the single sensor being assigned to the power unit;
    a drive device for the motor;
    a failsafe controller assigned to the drive device,
    wherein a sensor signal generated by the sensor is processed at least by the failsafe controller which includes redundantly configured monitoring devices,
    wherein a first or second shutdown path can be activated by the redundantly configured monitoring devices, and
    wherein the first shutdown path leads via a motor module and the second shutdown path leads via a motor controller as different component of the drive device,
    wherein the power unit is influenced by the motor module and/or the motor controller in accordance with a control signal received via the first or second shutdown path, and
    wherein the sensor signal is transmitted to the drive device which is implement at least partially in a failsafe manner.

11. The apparatus as claimed in claim 10, wherein the sensor signal is processed at least in the area of the drive device which for this purpose has an additional monitoring device and wherein a third shutdown path is activateable by the additional monitoring device.

12. A non-transitory computer readable storage medium encoded with a computer program, wherein the computer program when executed carries out the steps comprising:
    transmitting a sensor signal from a sensor to a failsafe controller, wherein the failsafe controller incorporates redundantly configured monitoring devices for evaluating the sensor signal, wherein each monitoring device monitors the sensor signal independently of the respective other monitoring device and is capable to generate a control signal for activating a first or second shutdown path, wherein
        the first shutdown path leads via a motor module and the second shutdown path leads via a motor controller as different components of the drive device and
        the power unit is influenced by the motor module and/or the motor controller in accordance with the control signal received via the first or second shutdown path, and
    transmitting the sensor signal to a drive device which is implemented at least partially in a failsafe manner.

* * * * *